United States Patent

Nishitani et al.

[11] Patent Number: 5,877,936
[45] Date of Patent: Mar. 2, 1999

[54] EXPANSION STRUCTURE FOR DOOR MOUNTED CIRCUIT BODIES

[75] Inventors: Keizo Nishitani; Yasuyoshi Serizawa; Satoru Unno, all of Shizuoka, Japan

[73] Assignee: Yazaki Corporation, Tokyo, Japan

[21] Appl. No.: 923,247

[22] Filed: Sep. 4, 1997

[30] Foreign Application Priority Data

Sep. 4, 1996 [JP] Japan ................................ 8-234071

[51] Int. Cl.⁶ ........................................................ H02B 1/00
[52] U.S. Cl. ............................ 361/600; 361/601; 174/69; 174/72 A; 174/72 TR; 174/DIG. 9; 439/34; 296/208; 191/12 R; 191/12.4
[58] Field of Search ................................... 361/600, 601; 174/72 A, 69, 72 TR; 296/208, 146.11; 439/34

[56] References Cited

U.S. PATENT DOCUMENTS

| 3,792,189 | 2/1974 | Stengel et al. ............................ 174/69 |
| 4,815,984 | 3/1989 | Sugiyama et al. ....................... 439/211 |
| 4,862,011 | 8/1989 | Wright .................................... 174/72 A |

FOREIGN PATENT DOCUMENTS 4-95546 8/1992 Japan .
8-33166 2/1996 Japan .
8-48146 2/1996 Japan .

*Primary Examiner*—Leo P. Picard
*Assistant Examiner*—Boris L. Chervinski
*Attorney, Agent, or Firm*—Armstrong, Westerman Hattori, McLeland & Naughton

[57] ABSTRACT

A circuit body (4) is received in an S-shaped configuration in a receiver (3) in a door. A protector (5) with a connector (6) is outwardly slidably provided inside the receiver (3). A circuit body fixing member (12) is provided at a front portion of the receiver (3), and a guide roller (15) is provided at a rear portion of the protector. The circuit body is wired from the fixing member (12) via the guide roller (15) into the protector and to the connector (6).

Alternatively, a circuit body fixing member (12) and a guide roller (23) may be provided at a front portion of a receiver (10), the latter in such a manner as to be positioned inside the protector 27. The circuit body is held down by the guide roller (23) inside the protector.

The circuit body is smoothly expanded and contracted with the opening and closing of the door.

8 Claims, 6 Drawing Sheets

FIG.11
PRIOR ART

EXPANSION STRUCTURE FOR DOOR MOUNTED CIRCUIT BODIES

BACKGROUND OF THE INVENTION

1. Field of the Invention

This invention relates to an expansion structure for door-mounted circuit bodies which enables a circuit body on the side of a door as of an automobile—which is connector-connected with a circuit body on the side of a body as of the automobile—to be expanded and contracted with the opening and closing of the door.

2. Description of the Related Art

Figure 11:
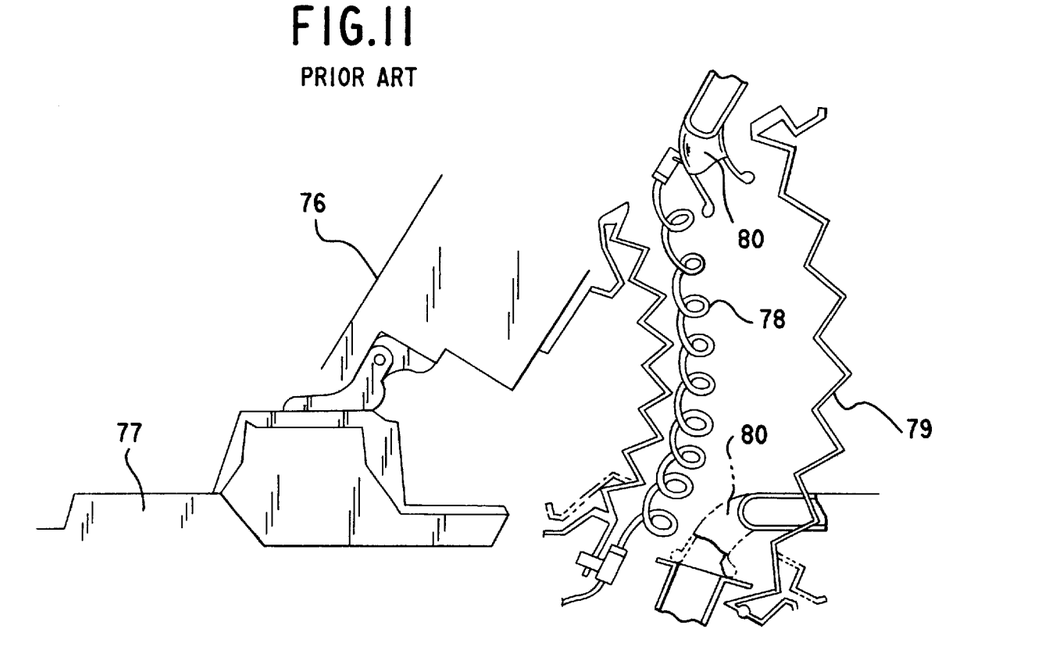
FIG. 11 is a transverse sectional view of a conventional expansion structure for door-mounted circuit bodies.

FIG. 11 shows a conventional door-mounted circuit body expansion structure as disclosed in Japanese Patent Application Laid-Open Specification No. 8-48146, in which a wiring harness 78 connecting a door 76 and a body 77 of an automobile is wound in the form of a coil to be expandable, and a bellows duct 79 is provided around the wiring harness 78 so as to enclose therein the wiring harness 78 as well as an air duct 80.

This structure absorbs the loosening of the wiring harness 78 at the time of opening and closing the door and enables a smooth door-opening and -closing operation. Further, since this structure does not require a waterproof grommet of rubber (not shown) such as shown in Japanese Patent Application Laid-Open Specification No. 8-33166, which is for between the door and the body of an automobile, the need for a troublesome inserting operation of the harness into a small-diameter grommet has been eliminated, leading to an improved operability for mounting.

In the above conventional structure, however, the wiring harness 78 is subject to entanglement when closing the door and thus to damages due to its binding in the duct 80, catching on the bellows duct 79 and the like. Further, confined in the bellows duct 79, the wiring harness 78 is subject to adverse effects from heat and the like.

SUMMARY OF THE INVENTION

This invention has been accomplished to overcome the above drawbacks and an object of this invention is to provide an expansion structure for door-mounted circuit bodies which does not cause a wiring harness to get entangled or catch on opening and closing the door, and which enables a smooth and reliable expansion and contraction of the wiring harness.

In order to attain the object, according to this invention, there is provided an expansion structure for door-mounted circuit bodies which comprises: a circuit body connecting a side of a door as of a vehicle to a side of a body as of the vehicle; and a circuit body receiver provided in the door for receiving therein the circuit body, wherein the circuit body is bent in a substantially S-shaped configuration to be received in the receiver.

Preferably, the expansion structure further comprises a protector having at a front portion a connector for connecting to the side of the body as of the vehicle and forwardly outwardly slidably provided in the circuit body receiver; a circuit body fixing member provided at a front portion of the circuit body receiver; and a guide roller rotatably provided at a rear portion of the protector, wherein the circuit body is fixed at the circuit body fixing member and therefrom wired via the guide roller into the protector and to the connector.

Alternatively, it is preferred that the expansion structure further comprises a protector having at a front portion a connector for connecting to the side of the body as of the vehicle and forwardly outwardly slidably provided in the circuit body receiver; a first circuit body fixing member provided at a front portion of the circuit body receiver; and a second circuit body fixing member provided adjacent to the connector, wherein the circuit body is fixed at the first circuit body fixing member and therefrom wired to and fixed at the second circuit body fixing member and to the connector.

Alternatively, it is preferred that the expansion structure further comprises a protector having at a front portion a connector for connecting to the side of the body as of the vehicle and forwardly outwardly slidably provided in the circuit body receiver; and a circuit body fixing member and a rotatable guide roller provided at spaced positions at a front portion of the circuit body receiver, the guide roller being provided such that it is located inside the protector, wherein the circuit body is fixed at the circuit body fixing member and therefrom wired via the guide roller into the protector and to the connector while being held down by the guide roller inside the protector.

Advantageously, the guide roller is provided with a pinion gear and the protector is provided with a rack corresponding to the pinion gear.

Advantageously, a support roller is provided opposed to the guide roller such that the circuit body and the protector are held therebetween.

Advantageously, a resilient member is further provided to bias the guide roller in a direction of holding the circuit body and the protector between it and the support roller.

Preferably, the circuit body fixing member has a curved surface around which the circuit body turns while being fixed.

Preferably, the circuit body receiver comprises a circuit body casing which has a circuit body wiring groove formed thereon and a circuit body fixing portion formed at a rear side of the circuit body receiver and continuous to the circuit body wiring groove.

The above and other objects, features and advantages of this invention will become apparent from the following description and the appended claims, taken in conjunction with the accompanying drawings in which like parts or elements are denoted by like reference characters.

DESCRIPTION OF THE PREFERRED EMBODIMENTS

Embodiments of this invention will now be described with reference to the attached drawings.

Figure 1:
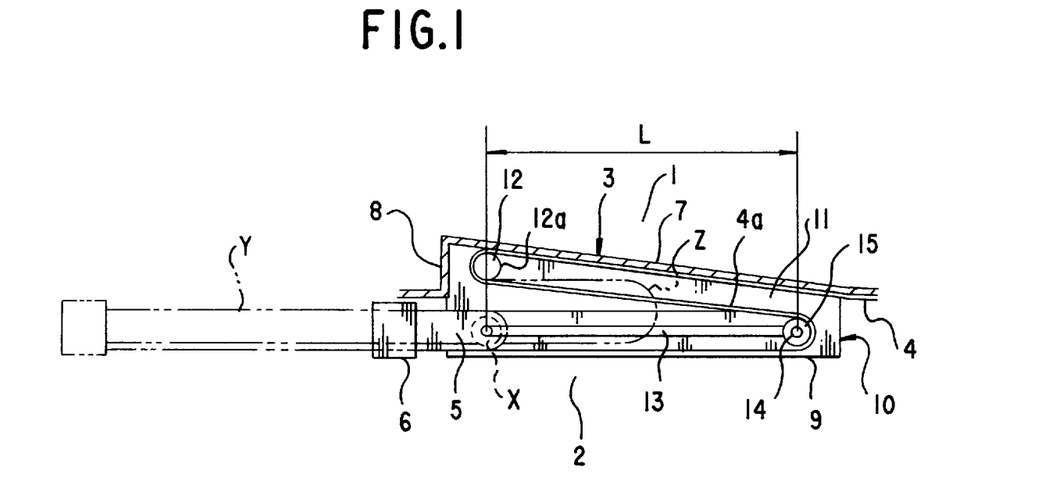
FIG. 1 is a transverse sectional view of an expansion structure for door-mounted circuit bodies according to a first embodiment of this invention.

FIG. 1 is a transverse sectional view of a door-mounted circuit body expansion structure according to one embodiment of this invention.

This structure includes a harness receiver 3 formed between, for example, a door panel 1 and a door trim 2 of a vehicle door. A flat wiring harness 4 is wired along the door panel 1 or the door trim 2 and bent in a substantially S-shape configuration to be contracted inside the harness receiver 3. At its front end the flat wiring harness 4 is connected to a connector 6 at the front end of a harness protector 5. The bent portion 4a of the wiring harness inside the harness receiver 3 expands with the forward outward movement of the protector 5.

The harness receiver 3 is constituted by a harness casing 10 provided bulged, for example, from the door trim 2 to the side of the door panel 1, which has a taper wall 7, a front wall 8 provided at the front end of the taper wall 7 to extend toward the door trim 2, and upper and lower walls 9 extending from the taper wall 7 and the front wall 8 to the side of the door trim 2, and has a harness receiving chamber 11 formed therein. One example of the configuration of such a harness casing will be later described in detail in connection with FIG. 5.

A harness fixing member 12 is provided toward the front end (left side end on the drawing) of the taper wall 7. The harness fixing member 12 is circular in cross section with a curved surface 12a of R-shape therearound and is at the upper and lower ends secured, for example, to the upper and lower walls 9, with a harness passing space provided between it and the taper wall 7. The upper and lower walls 9 are formed with respective longitudinally (front and back) extending guide grooves 13 for guiding the protector 5.

The protector 5 is formed of synthetic resin to have, for example, a U-shaped vertical cross section and has at the rear end slide shafts 14 for engagement in the guide grooves 13 and at the front end a connector 6 to which is connected the wiring harness 4. To the slide shafts 14 cylindrical guide rollers 15 are rotatably provided which are, together with the slide shafts 14, movable along the guide grooves.

The flat wiring harness 4 is wired along the taper wall 7 from the rear, fixed at the harness fixing member 12, turned back along the curved surface 12a, bent and turned back around the guide rollers 15, and passed into the protector 5 to connect to the connector 6 which is fitted to a connector 18 (FIG. 5) of a wiring harness 17 on the side of a vehicle body 16.

In this example, the harness fixing member 12 and the foremost advancement position X of the guide rollers 15 are longitudinally substantially at the same position, and the amount of slide L of the protector 5, i.e., the extendable stroke of the wiring harness is about 200 mm. With the door opening operation, the protector 5 and the wiring harness 4 are drawn out of the harness receiver 3 as indicated by dotted lines Y. The guide rollers 15 advance together with the protector 5, letting the bent portion 4a of the wiring harness 4 leave the guide rollers 15 and remain in a substantially U-shaped configuration inside harness receiver 3 as indicated by dotted lines Z. On closing the door, as shown in solid lines in FIG. 1, the protector 5 is received inside the harness receiver 3, while at the same time the guide rollers 15 push the wiring harness 4 back to the rear end side of the harness receiver 3 and into position where the wiring harness 4 is accommodated in a strained substantially S-shaped configuration.

In this instance, the harness fixing member 12 and the guide rollers 15 contact the wiring harness 4 through their curved surfaces. Besides, the guide rollers 15 rotate in contacting the wiring harness 4. Accordingly, fatigue of a conductor portion of the wiring harness 4 due to its continuous bending will be prevented. Likewise, wear and the like of the insulating cover of the wiring harness 4 due to its rubbing will be prevented. Flat wiring harnesses usable in this invention include a flexible printed circuit body, a ribbon wire and the like.

Figure 2:
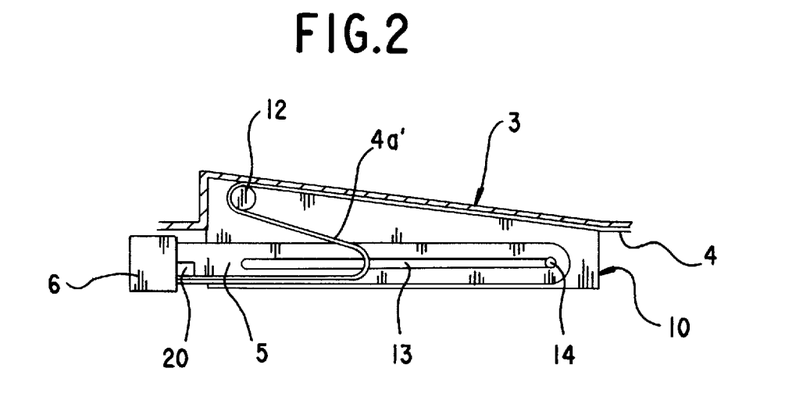
FIG. 2 is a transverse sectional view of an expansion structure for door-mounted circuit bodies according to a second embodiment of this invention.

FIG. 2 shows an example in which the wiring harness inside the harness receiver has been shortened.

The harness fixing member 12 is provided in the harness casing 10 as in the preceding example, and the wiring harness 4 is via the harness fixing member 12 bent in a substantially S-shaped configuration, and is directly connected to a harness fixing member 20 at the connector 6 of the protector 5, without using the guide rollers 15 (FIG. 1). On closing the door, the slide shafts 14 of the protector 5 are located at the rear end of the guide grooves 13, and the bent portion 4a' of the wiring harness 4 is located at a front half of the inside of the harness receiver 3, thus attaining a reduction in the length of the bent portion 4a' as compared with the bent portion 4a in FIG. 1.

Figure 3:
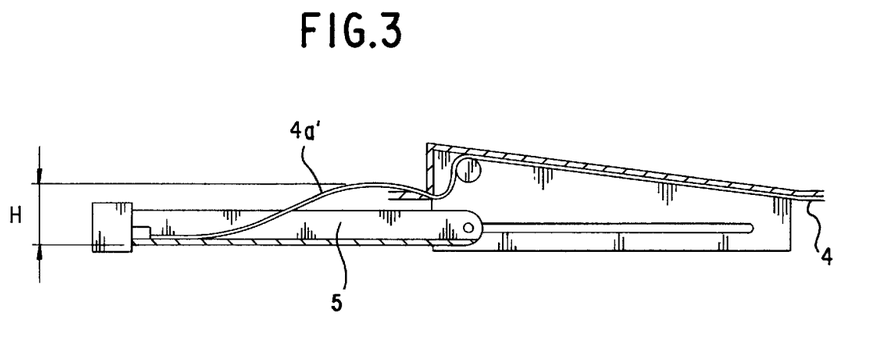
FIG. 3 is a transverse sectional view of the second embodiment in which a circuit body is lengthened.

When opening the door, with the moving out of the protector 5, the wiring harness 4a' rises to the outside of the protector 5 as shown in FIG. 3. If the degree of rising H of the wiring harness 4a' is large, it gives rise to a fear that the wiring harness 4a' may get jammed at the time of closing the door. The embodiment as shown in FIG. 4 is for eliminating this rising H.

Figure 4:
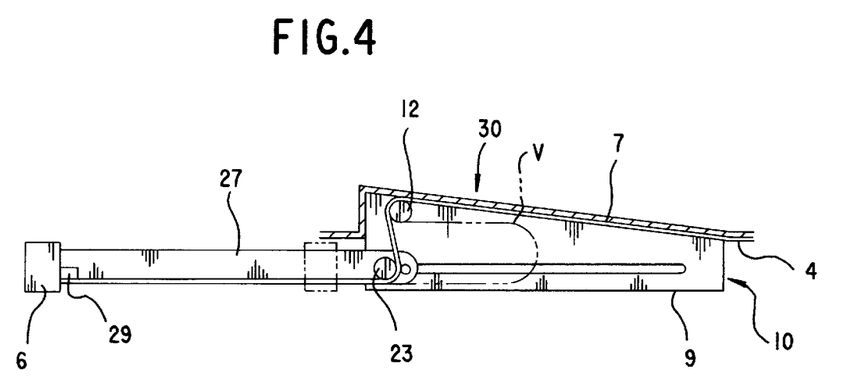
FIG. 4 is a transverse sectional view of an expansion structure for door-mounted circuit bodies according to a third embodiment of this invention.

In the structure of FIG. 4, guide rollers 23 for preventing the rising of the harness are rotatably provided toward the front end of the upper and lower walls 9. The flat wiring harness 4 is in the door opened state wired such that it extends straight without loosening from the harness fixing member 12 near the front end of the taper wall 7 to the guide rollers 23, and therefrom to the connector 6 of the protector 27, fixed at a harness fixing member 29 adjacent to the connector 6. On closing the door, the wiring harness 4 is received in a substantially U-shaped configuration in the harness receiver 30 as indicated by dotted lines V.

Figure 5:
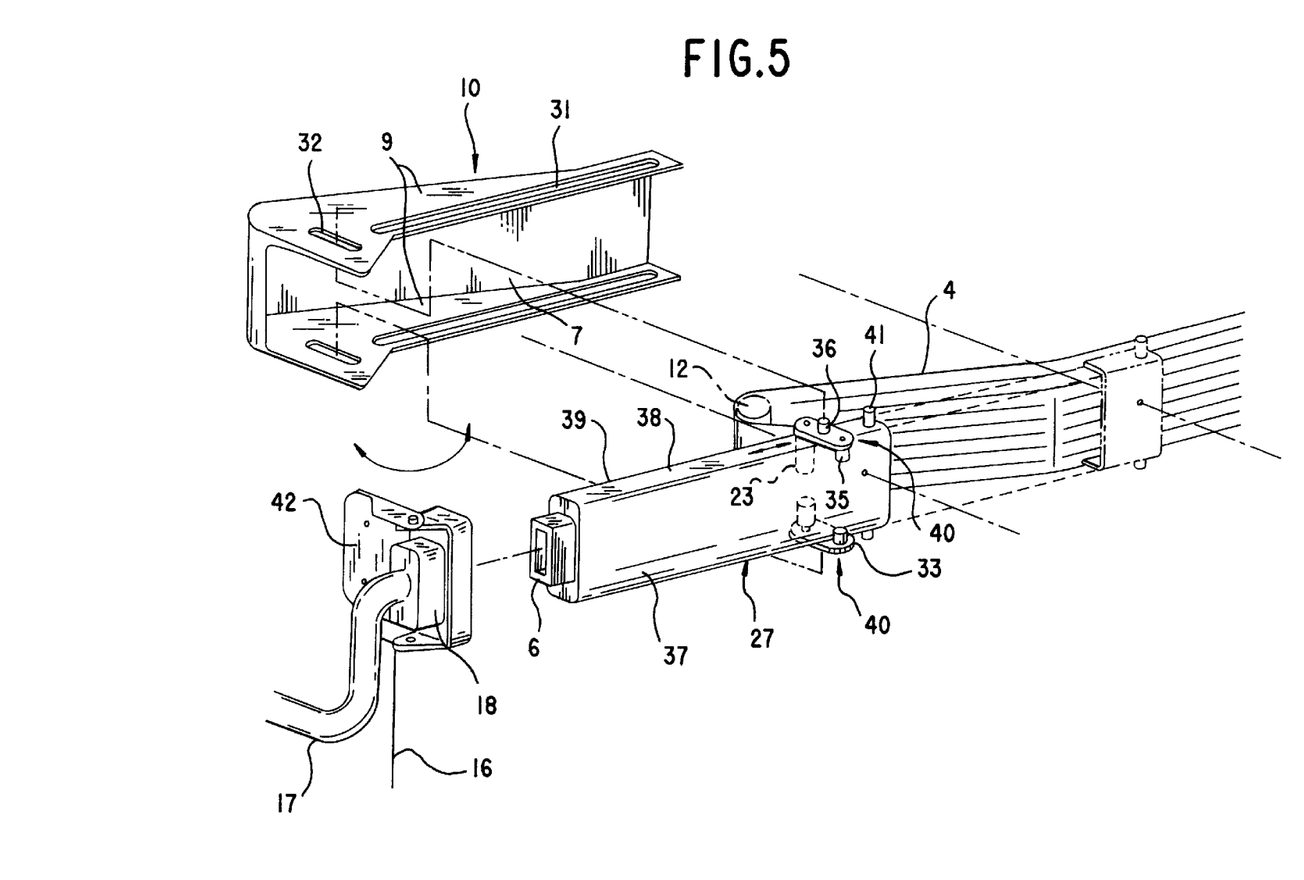
FIG. 5 is an exploded perspective view showing details of the expansion structure according to the third embodiment.

FIG. 5 shows a structure in which the guide rollers 23 of FIG. 4 are adapted to forcibly move the wiring harness 4 into and out of the harness receiver 30.

The upper and lower walls 9 of the harness casing 10 have longitudinally extending guide grooves 31 for guiding the slide of the harness protector 27 and toward their front end short guide grooves 32 for supporting the guide rollers 23, which extend perpendicular to the longitudinal guide grooves 32. The upper and lower walls 9, along the taper wall 7, become larger in width toward their front end at which they are wide enough for providing the guide grooves 32.

Figure 6:
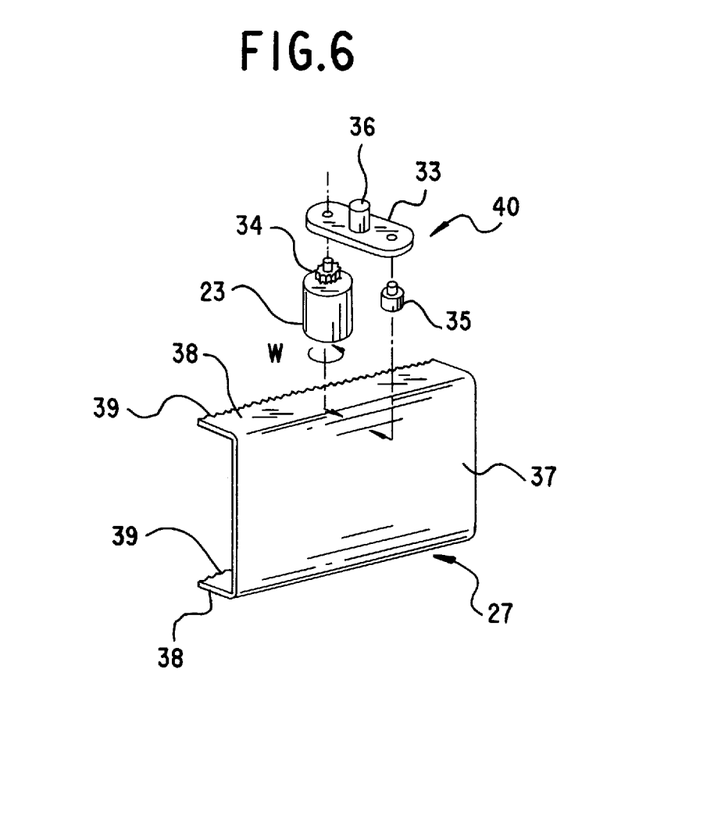
FIG. 6 is an exploded perspective view of a guide roller unit used in the third embodiment.
Figure 7:
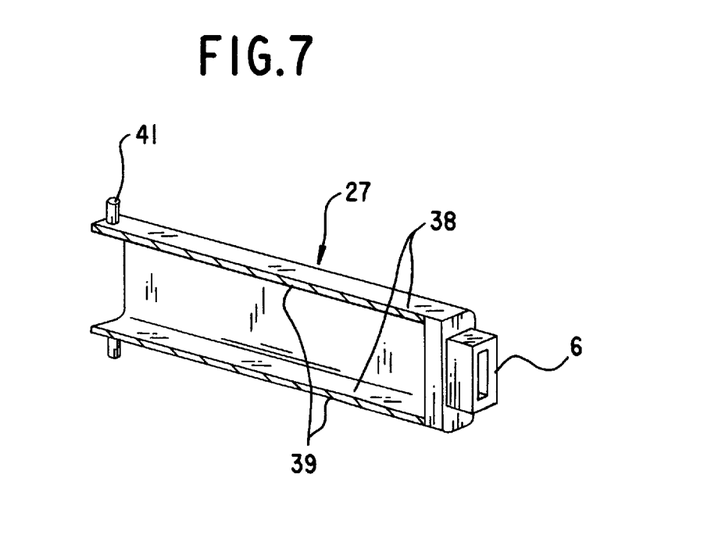
FIG. 7 is a perspective view of a protector with a rack used in the third embodiment.

The guide roller 23, as shown in FIG. 6, is rotatably provided at one end of a flat bracket 33 via a pinion gear 34 which is integral with the guide roller 23. A small support roller 35 is rotatably provided at the other end of the bracket 33 in opposition to the pinion gear 34. The bracket 33 is at the center provided with a short cylindrical shaft 36 which is engageable in the related short guide groove 32. The guide roller 23 and the support roller 35 are disposed so as to hold therebetween a side wall 37 of the harness protector 27 of U-shaped vertical section. The upper and lower walls 38, 38 of the protector 27, as shown in FIG. 7, are formed integrally or separately with racks 39 engageable with respective pinion gears 34.

Reverting to FIG. 5, a pair of guide roller units 40 constructed as described above are disposed at upper and lower sides of the protector 27. The flat wiring harness 4 is via the fixing member 12 bent in a substantially S-shaped configuration and extends between the guide rollers 23 and the support rollers 35, along an inner surface of the side wall 37 of the protector 27 and to the connector 6 at the front end of the protector. The support rollers 35 are in contact with an outer surface of the protector side wall 37, and the guide rollers 23 are in contact with the wiring harness 4.

The upper and lower walls 38 of the protector 27 are at the rear end provided with a pair of upper and lower projecting slide shafts 41 which are engageable in the guide grooves 31 of the harness casing 10. The connector 6 of the protector 27 fits to the connector 18 of the wiring harness 17 on the side of the vehicle body 16. When opening and closing the door, the protector 27 oscillates left and right around the slide shafts 41 at its rear end. Thus, the elongated guide grooves 32 allow for the co-oscillating of the bracket shafts 36 with the protector 27.

With the structure as described above, when the door is closed and the protector 27 is slided back into the harness casing 10 along the guide grooves 31, the racks 39 rotate the pinion gears 34 and thus the guide rollers 23 in the direction of an arrow W in Fig. FIG. 6. Consequently, the wiring harness 4, which is in contact with the guide rollers 23, is forcibly moved into the harness casing 10. The guide rollers 23 rotate while pressing the wiring harness 4 against the protector 27, removes otherwise possible frictional resistance, and allow the wiring harness 4 to be smoothly received in the harness casing 10. Likewise, when the door is opened and the protector 27 is drawn out, the racks 39 rotate the guide rollers 23 in a direction opposite the arrow W to forcibly move the wiring harness 4 out.

The guide rollers 23 and the support rollers 35 and/or the cover of the flat wiring harness 4 may be formed of material of a high coefficient of friction such as rubber. This allows the wiring harness 4 to be more reliably and smoothly moved into and out of the harness casing 10.

The connector 18 on the side of the vehicle body 16 is rotatably provided via a bracket 42, for example, to a side of an instrument panel (dashboard). The vehicle body side wiring harness 17 depends from the connector 18 and is twistable with the rotating of the connector 18 at the time of opening and closing the door. Such a structure has been proposed in Japanese Patent Application No. 8-176687, etc. by the Applicant.

Owing to the above structure, since the connectors on the door and the vehicle body sides are fitted at a position visible to the eye, a reliable connection and an easy detachment for maintenance are attained. Since these connectors are fitted inside the vehicle, a waterproof structure involving a grommet or the like is not required, and the harness casing 10—which may be of substantially U-shaped vertical section—may be mounted to open to the outside. Thus, the wiring harness is not subject to adverse effects from heat and the like as is the case with the prior art in which the wiring harness is confined in the bellows duct (at 79 in FIG. 11).

Figure 8:
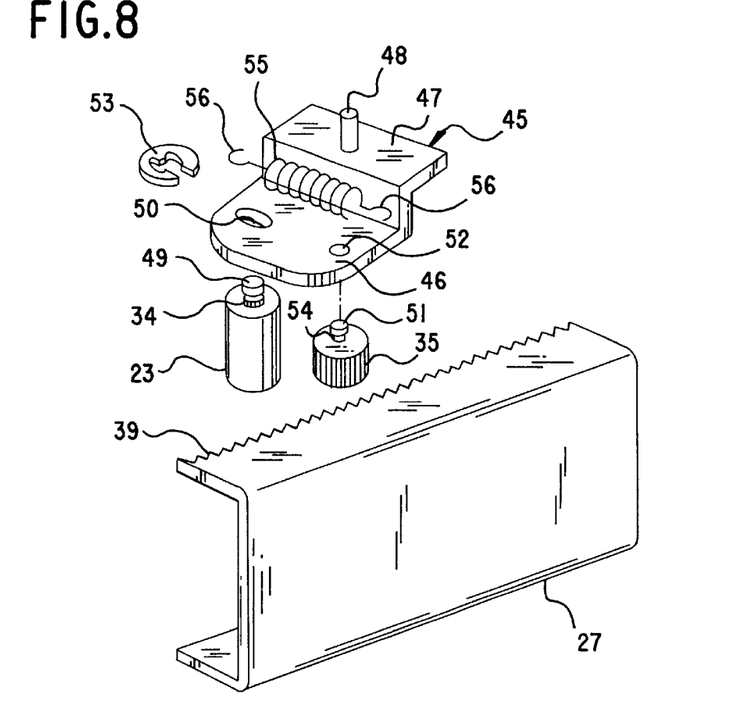
FIG. 8 is an exploded perspective view of another embodiment of a guide roller unit.

FIG. 8 shows a structure in which a resilient member is employed to bias the guide roller 23 and the support roller 35 toward each other and forcibly bring the guide roller 23 into close contact with the flat wiring harness 4.

The bracket 45 is formed in a step-plate, and to its lower plate 46 are rotatably provided the guide roller 23 and the support roller 35, and on its upper plate 47 is projectingly provided an engagement shaft 48 which engages in the guide groove 31 of the harness casing 10. The lower plate 46 is formed with an elongated hole 50 for the engagement therein of a shaft 49 of the guide roller 23 and with a hole 52 for the insertion therein of a shaft 51 of the support roller 35. Around each shaft 49, 51 is provided an engagement groove 54 for a locking ring 53.

The shafts 49, 51 of the rollers 23, 35 are biased toward each other (in a direction of holding the wiring harness therebetween) by a tension spring (resilient member) 55. Hook ends 56 of the tension spring 55 engage the respective shafts 49, 51 at lower sides of the locking rings 53. Under the tension of the coil spring 55, the guide roller 23 is movable in a direction perpendicular to the harness within the range of the elongated hole 50. The shaft 49 of the guide roller 23 is provided with a pinion gear 34 engageable with the rack 39 as in the preceding example.

The tension spring 55 brings the guide roller 23 into close contact with the flat wiring harness 4 (FIG. 5), and slippage between the guide roller 23 and the wiring harness 4 is eliminated, resulting in the wiring harness 4 more reliably moved in and out. Needless to say, the rollers 23, 35 may be formed of resilient material such as rubber or the like.

Figure 9:
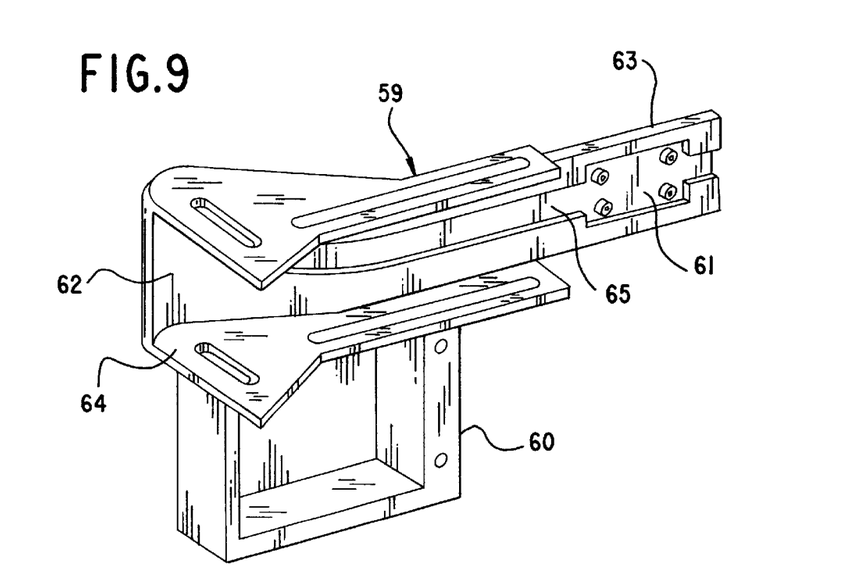
FIG. 9 is a perspective view of a circuit body receiver of a one unit type.

FIG. 9 shows an example in which, for simplifying constituent parts of an automobile door, a harness casing 59 is integrally provided with a speaker bracket 60 and a controller casing (communication control substrate casing) 61.

A not-shown communication control substrate is mounted in the controller casing 61. One example of such a communication control substrate has a multicommunication function for door-mounted auxiliaries and a programming function for door switches and has been proposed by the Applicant in Japanese Patent Application No. 8-77203. The controller casing 61 is integrally provided on a rear extended wall 63 which is continuous to the taper wall 62 and parallel to the door trim. The speaker bracket 60 is integrally provided on the lower wall 64. Owing to the above, a reduction in the number of parts has been attained. A harness wiring groove 65 is formed from the rear extended wall 63 to the taper wall 62 for the positioning therealong of the flat wiring harness.

Figure 10:
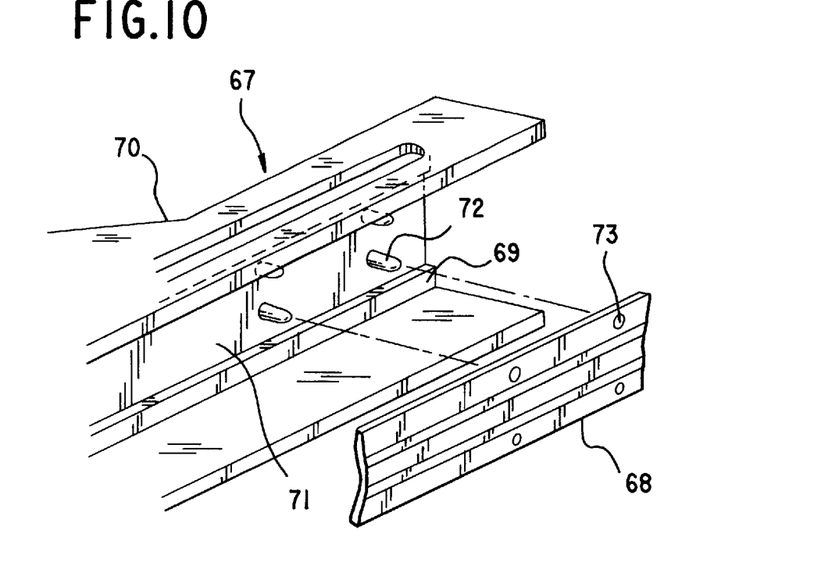
FIG. 10 is an exploded perspective view of a structure for fixing a circuit body in a circuit body receiver.

FIG. 10 shows a structure for fixing a flat wiring harness 68 in a harness casing 67.

A harness wiring groove 71 is formed from a rear wall 69 to a taper wall 70 of a synthetic-resin made harness casing 67, and a plurality of harness fixing pins 72 are integrally and projectingly provided in the harness wiring groove 71 at the rear wall 69. The flat wiring harness 68 is in its cover formed with engagement holes 73, and the fixing pins 72 are inserted therethrough to position the wiring harness 68 in the wiring groove 71, at which time the fixing pins are at their front ends fused to secure the wiring harness 68 to the rear wall 69 of the harness casing 67.

With the wiring harness 68 fixed in place in the harness casing 67, the wiring harness 68 is prevented from being longitudinally or vertically deviated, and a bend of the wiring harness 68 is without fail formed inside the harness casing 67 on closing the door.

Having now fully described the invention, it will be apparent to one of ordinary skill in the art that many changes and modifications can be made thereto without departing from the spirit and scope of the invention as set forth herein.

What is claimed is:

1. An expansion structure for door-mounted circuit bodies comprising:

a harness connecting a side of a door of a vehicle to a side of a body of said vehicle; and a harness receiver provided in said door for receiving therein said harness;

a protector having at a front portion a connector for connecting to said side of the body as of said vehicle and slidably provided in said harness receiver in a forward and outward direction of said harness receiver;

a harness fixing member provided at a front portion of said harness receiver; and a guide roller rotatably provided at a rear portion of said protector, wherein said harness is bent in a substantially S-shaped configuration to be received in said receiver and wherein said harness is fixed at said harness fixing member and therefrom wired via said guide roller into said protector and to said connector.

2. An expansion structure for door-mounted circuit bodies comprising:

a harness connecting a side of a door of a vehicle to a side of a body of said vehicle; and a harness receiver provided in said door for receiving therein said harness;

a protector having at a front portion a connector for connecting to said side of the body as of said vehicle and slidably provided in said harness receiver in a forward and outward direction of said harness receiver;

a first harness fixing member provided at a front portion of said harness receiver; and a second harness fixing member provided adjacent to said connector, wherein said harness is fixed at said first harness fixing member and therefrom wired to and fixed at said second harness fixing member and to said connector.

3. An expansion structure for door-mounted circuit bodies comprising:

a harness connecting a side of a door of a vehicle to a side of a body of said vehicle; and a harness receiver provided in said door for receiving therein said harness;

a protector having at a front portion a connector for connecting to said side of the body as of said vehicle and slidably provided in said harness receiver both in a forward direction and an outward direction of said vehicle; and a harness fixing member and a rotatable guide roller provided at spaced positions at a front portion of said harness receiver, said guide roller being provided such that it is located inside said protector, wherein said harness is fixed at said harness fixing member and therefrom wired via said guide roller into said protector and to said connector while being held down by said guide roller inside said protector.

4. The expansion structure according to claim 3, wherein said guide roller is provided with a pinion gear and said protector is provided with a rack corresponding to said pinion gear.

5. The expansion structure according to claim 4, wherein a support roller is provided opposed to said guide roller such that said harness and said protector are held therebetween.

6. The expansion structure according to claim 5, wherein a resilient member is further provided to bias said guide roller in a direction of holding said harness and said protector between said guide roller and said support roller.

7. The expansion structure according to claim 1, wherein said harness fixing member has a curved surface around which said harness turns while being fixed.

8. The expansion structure according to claim 1, wherein said harness receiver comprises a harness casing which has a harness wiring groove formed thereon and a harness fixing portion formed at a rear side of said harness casing and continuous to said harness wiring groove.

* * * * *